(12) United States Patent
Nakano

(10) Patent No.: US 12,458,218 B2
(45) Date of Patent: Nov. 4, 2025

(54) ENDOSCOPE REPROCESSOR, CONTROL APPARATUS, AND CONTROL METHOD

(71) Applicant: OLYMPUS MEDICAL SYSTEMS CORP., Tokyo (JP)

(72) Inventor: Hiroto Nakano, Kawasaki (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 86 days.

(21) Appl. No.: 18/508,495

(22) Filed: Nov. 14, 2023

(65) Prior Publication Data

US 2024/0074647 A1 Mar. 7, 2024

Related U.S. Application Data

(63) Continuation of application No. PCT/JP2021/019383, filed on May 21, 2021.

(51) Int. Cl.
| | | |
|---|---|---|
| *A61B 1/12* | (2006.01) | |
| *A61B 90/70* | (2016.01) | |
| *A61L 2/18* | (2006.01) | |

(52) U.S. Cl.
CPC .............. *A61B 1/123* (2013.01); *A61B 1/125* (2013.01); *A61B 90/70* (2016.02); *A61L 2/18* (2013.01); *A61B 2090/701* (2016.02); *A61L 2202/122* (2013.01); *A61L 2202/123* (2013.01); *A61L 2202/14* (2013.01); *A61L 2202/24* (2013.01)

(58) Field of Classification Search
None
See application file for complete search history.

(56) References Cited

U.S. PATENT DOCUMENTS

2015/0305608 A1 10/2015 Komiya et al.

FOREIGN PATENT DOCUMENTS

| EP | 2918219 A1 | 9/2015 |
|---|---|---|
| JP | S58156384 A | 9/1983 |
| JP | S60220032 A | 11/1985 |
| JP | H11276435 A | 10/1999 |
| JP | 2000316806 A | 11/2000 |
| JP | 2009189415 A | 8/2009 |
| JP | 2015070947 A | 4/2015 |

(Continued)

OTHER PUBLICATIONS

Google Patents translation of JP2016041390A (Year: 2025).*

(Continued)

*Primary Examiner* — Eric W Golightly
(74) *Attorney, Agent, or Firm* — Scully, Scott, Murphy & Presser, P.C.

(57) ABSTRACT

An endoscope reprocessor includes: a cleaning tank in which an endoscope is placed; an endoscope connecting unit configured to be connected to a channel of the endoscope; a top cover configured to cover an upper part of the cleaning tank; a first ejection unit configured to eject a cleaning solution toward an inner surface of the top cover; a first pump connected to the first ejection unit; and a control unit provided with a processor configured to feed a liquid to the channel of the endoscope by controlling the first pump, in which the processor acquires a type of the endoscope, controls the first pump during cleaning according to the type of the endoscope, and causes the cleaning solution to be delivered from the first ejection unit.

8 Claims, 5 Drawing Sheets

(56) References Cited

FOREIGN PATENT DOCUMENTS

| | | |
|---|---|---|
| JP | 2016041390 A | 3/2016 |
| JP | 2017055893 A | 3/2017 |
| WO | 2014103881 A1 | 7/2014 |

OTHER PUBLICATIONS

Google Patents translation of JPS60220032A (Year: 2025).*
International Search Report dated Aug. 17, 2021 issued in PCT/JP2021/019383, 5 pages.

* cited by examiner

ENDOSCOPE REPROCESSOR, CONTROL APPARATUS, AND CONTROL METHOD

CROSS REFERENCE TO RELATED APPLICATION

This application is a continuation application of PCT/JP2021/019383 filed on May 21, 2021, the entire contents of which are incorporated herein by this reference.

BACKGROUND OF THE INVENTION

1. Field of the Invention

The present invention relates to an endoscope reprocessor that cleans and disinfects an endoscope, a control apparatus, and a control method.

2. Description of the Related Art

An endoscope used in the medical field undergoes a reprocessing process such as a cleaning process and a disinfection process after use using medicinal solutions. As an apparatus that automatically performs a reprocessing process of an endoscope, an endoscope reprocessor is known. The endoscope reprocessor cleans an interior of an endoscope channel by connecting the endoscope channel to an endoscope connecting unit and supplying a cleaning solution into the endoscope channel through the endoscope connecting unit.

As examples of such an endoscope reprocessor, Japanese Patent Application Laid-Open Publication No. 58-156384 and Japanese Patent Application Laid-Open Publication No. 2016-41390 disclose configurations in which a gas-liquid two-phase fluid resulting from mixing a cleaning solution and compressed air is supplied into an endoscope channel. With such configurations, contaminants and the like sticking to an inner wall of the endoscope channel and unable to be removed by simply sending a cleaning solution into the endoscope channel are removed by using the gas-liquid two-phase fluid.

Another configuration of the endoscope reprocessor that supplies a gas-liquid two-phase fluid into an endoscope channel is also well known. Specifically, the endoscope channel is filled with a liquid and then gas is supplied into the endoscope channel under high pressure. The use of removal forces exerted by the gas in removing the liquid out of the endoscope channel provides higher detergency with respect to the interior of the endoscope channel than when simply a gas-liquid two-phase fluid made up of a mixture of a cleaning solution and compressed air is supplied into an endoscope channel.

SUMMARY OF THE INVENTION

An endoscope reprocessor according to one aspect of the present invention includes: a cleaning tank in which an endoscope is placed; an endoscope connecting unit configured to be connected to a channel of the endoscope; a top cover configured to cover an upper part of the cleaning tank; a first ejection unit configured to eject a cleaning solution toward an inner surface of the top cover; a first pump connected to the first ejection unit; and a control unit provided with a processor configured to feed a liquid to the channel of the endoscope by controlling the first pump, in which the processor acquires a type of the endoscope, controls the first pump during cleaning according to the type of the endoscope, and causes the cleaning solution to be delivered from the first ejection unit.

A control apparatus according to one aspect of the present invention includes a processor, in which the processor: controls a first pump configured to supply a cleaning solution to a cleaning tank in which an endoscope is placed; and acquires a type of the endoscope, controls the first pump according to the type of the endoscope, and causes the cleaning solution to be delivered from an ejection unit to a top cover covering the cleaning tank.

A control method according to one aspect of the present invention is a method for controlling a first pump configured to supply a cleaning solution to a cleaning tank in which an endoscope is placed, the method including: acquiring a type of the endoscope; controlling the first pump according to the type of the endoscope; and causing the cleaning solution to be delivered from an ejection unit to a cover covering the cleaning tank.

DETAILED DESCRIPTION OF THE PREFERRED EMBODIMENTS

Embodiments of the present invention will be described below with reference to the drawings.

First Embodiment

Figure 1:
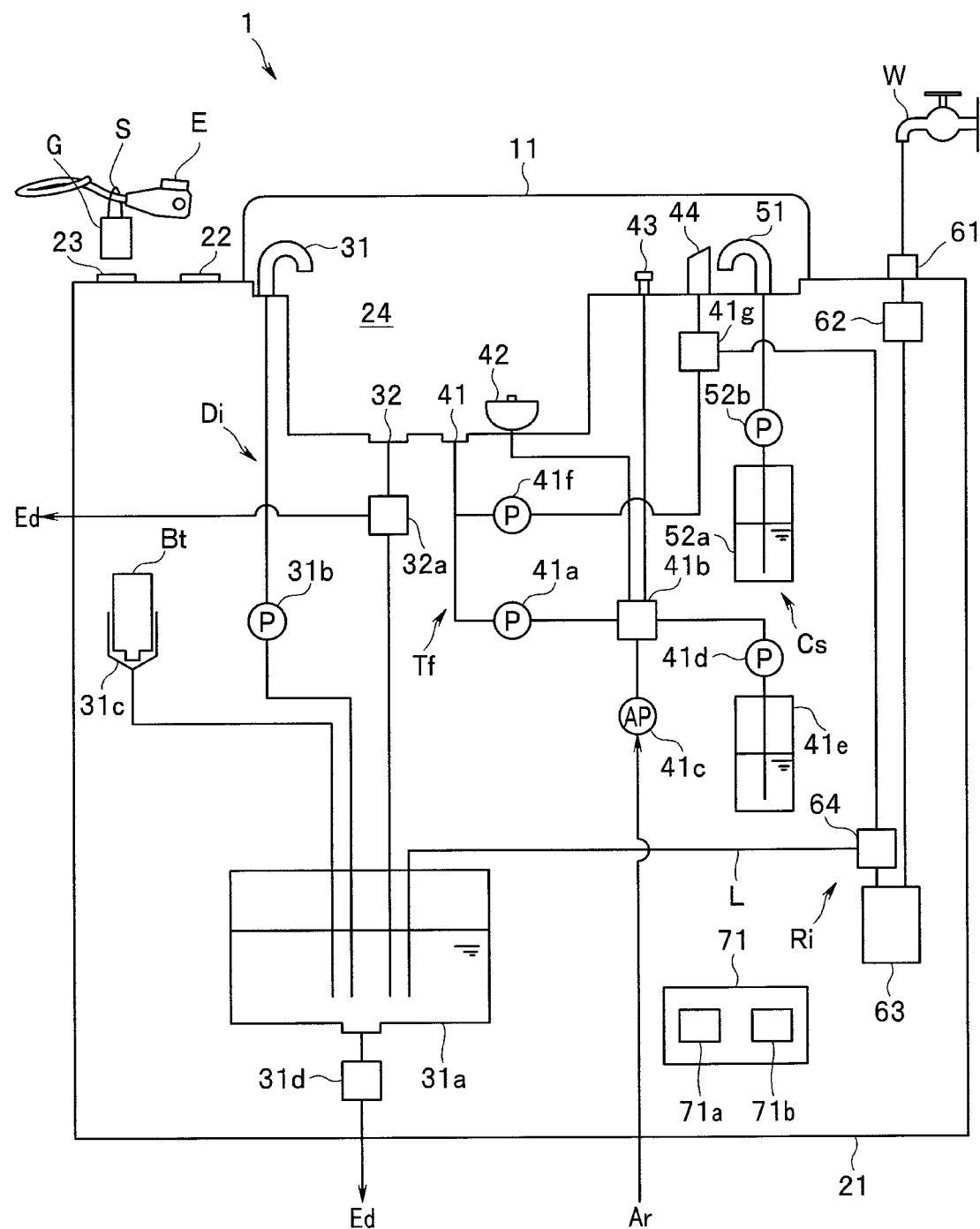
FIG. 1 is a block diagram showing a configuration example of an endoscope reprocessor 1 according to a first embodiment of the present invention.

FIG. 1 is a block diagram showing a configuration example of an endoscope reprocessor 1 according to a first embodiment of the present invention. In FIG. 1, electric signal lines are omitted.

The endoscope reprocessor 1 is an apparatus that performs a reprocessing process of a contaminated endoscope E as well as components, accessories, or the like (hereinafter referred to simply as "accessories") of the endoscope E. The reprocessing process referred to herein is not specifically limited, and may be any of: rinsing by water, cleaning done to remove contamination with organic matter or the like, disinfection carried out to neutralize predetermined microorganisms, sterilization carried out to eliminate or annihilate all microorganisms, or a combination of rinsing, cleaning, disinfection, and sterilization. The accessories are not specifically limited, and possible examples of the accessories include an aspiration button and an air/water feeding button, which are attached to the endoscope E during use and removed from the endoscope E during the reprocessing process, as well as a distal end cover configured to cover a distal end of the endoscope E.

The endoscope reprocessor 1 includes a top cover 11 and an apparatus main body 21.

The top cover 11 is openably provided on an upper part of the apparatus main body 21. The top cover 11 covers an upper part of an after-mentioned treatment tank 24 in which the endoscope E is placed. When the top cover 11 is opened, the treatment tank 24 is exposed to the outside.

The apparatus main body 21 includes an operation section 22, a tag reader 23, the treatment tank 24, a medicinal solution introduction unit Di, a discharge port 32, a fluid feeding unit Tf, a cleaning solution introduction unit Cs, a water introduction unit Ri, and a control unit 71.

The operation section 22 is provided in front part of the apparatus main body 21 and accepts various types of instruction input concerning the reprocessing process of the endoscope E. The operation section 22 is electrically connected to the control unit 71 and outputs operation signals to the control unit 71 according to the various types of instruction input.

The tag reader 23 is provided in front part of the apparatus main body 21. In order to be able to read endoscope information from a wireless tag G, which is an endoscope information source described later, the tag reader 23, which is an endoscope information reading unit, is made up of an RFID (radio frequency identification) reader capable of short-range communications. The tag reader 23 includes a transmission unit, a reception unit, and an antenna.

The transmission unit is a circuit configured to transmit electromagnetic waves, which are energy waves, to the wireless tag G attached to the endoscope E by a string S or the like, via the antenna.

The reception unit is a circuit configured to receive information sent from an endoscope information source, via the antenna. The information sent from an endoscope information source referred to herein may be either a signal spontaneously sent from an endoscope information source or reflected waves returned from an endoscope information source after the energy waves sent by the transmission unit reaches the endoscope information source. According to the present embodiment, the reception unit is a circuit configured to receive reflected waves transmitted from the wireless tag G, which is an endoscope information source.

The wireless tag G, which is an endoscope information source, stores endoscope information including identification information such as a model type or a serial number. When electromagnetic waves are received from the tag reader 23, the wireless tag G transmits reflected waves containing the endoscope information to the tag reader 23.

The reflected waves are made up of electromagnetic waves containing the endoscope information. The reflected waves include waves reflected by the wireless tag G with the endoscope information added to the electromagnetic waves transmitted from the tag reader 23, and also include a response signal generated by the wireless tag G with the endoscope information included and transmitted as response waves in response to the electromagnetic waves transmitted from the tag reader 23. The tag reader 23, which is electrically connected to the control unit 71, outputs the endoscope information contained in the received reflected waves to the control unit 71.

Note that a communication method for the tag reader 23 and the wireless tag G is, for example, an electromagnetic coupling method, an electromagnetic induction method, or a radio wave method, but may be another communication method.

The treatment tank 24 making up a cleaning tank has a concave shape to allow the endoscope E to be placed.

The medicinal solution introduction unit Di is configured to allow a medicinal solution to be introduced into the treatment tank 24. The medicinal solution introduction unit Di includes a medicinal solution nozzle 31, a tank 31a, and a medicinal solution pump 31b. The medicinal solution is, for example, a disinfectant solution including peracetic acid. Note that the medicinal solution may be a sterilizing solution rather than a disinfectant solution.

The medicinal solution nozzle 31 is provided in the treatment tank 24 so as to be able to eject the medicinal solution into the treatment tank 24.

The tank 31a communicates with the treatment tank 24 and stores the medicinal solution. The tank 31a is connected with the medicinal solution nozzle 31. A liquid concentrate of the medicinal solution is introduced into the tank 31a from a medicinal solution bottle Bt attached to a bottle connecting unit 31c. The liquid concentrate of the medicinal solution is diluted by water introduced from a water introduction unit Ri and prepared into a medicinal solution of a predetermined concentration. In FIG. 1, water passing through a water filter 63 is introduced into the tank 31a through a dilution water channel L, but may be introduced into the tank 31a through the treatment tank 24.

The tank 31a is connected with a drain valve 31d. When the drain valve 31d is opened, the medicinal solution in the tank 31a is discharged to external drainage means Ed.

The medicinal solution pump 31b feeds a liquid from the tank 31a to the treatment tank 24. The medicinal solution pump 31b is placed in a channel between the tank 31a and the medicinal solution nozzle 31. The medicinal solution pump 31b, which is connected to the control unit 71, can take in a medicinal solution from the tank 31a and feed the medicinal solution to the treatment tank 24 through the medicinal solution nozzle 31 under the control of the control unit 71.

The discharge port 32 is provided in the treatment tank 24 and used to discharge the liquid stored in the treatment tank 24. The discharge port 32 is connected with a three-way valve 32a. The three-way valve 32a is a directional selector valve controlled by the control unit 71. The discharge port 32 communicates with either the tank 31a or the external drainage means Ed via the three-way valve 32a.

The fluid feeding unit Tf is configured to be able to take in a liquid from the treatment tank 24 through a circulation port 41 and feed a gas or a liquid to an accessory case 42, a connector 43, and a circulation nozzle 44. The fluid feeding unit Tf includes the circulation port 41, a liquid feeding pump 41a, a flow channel selector valve 41b, an air compressor 41c, an alcohol pump 41d, an alcohol tank 41e, a circulation pump 41f, and a water supply selector valve 41g.

The circulation port 41 is provided in the treatment tank 24 in such a way as to be able to take in the liquid stored in the treatment tank 24, and is connected to the liquid feeding pump 41a and the circulation pump 41f.

The liquid feeding pump 41a feeds the liquid from the treatment tank 24 to the accessory case 42 and the connector 43. The liquid feeding pump 41a is placed in a channel between the circulation port 41 and the flow channel selector valve 41b. The liquid feeding pump 41a is capable of communicating with either the accessory case 42 or the connector 43 via the flow channel selector valve 41b. The liquid feeding pump 41a, which is connected to the control unit 71, can take in the liquid from the treatment tank 24 through a circulation port 41 and feed the liquid to a channel connected with the flow channel selector valve 41b under the control of the control unit 71.

The flow channel selector valve 41b is made up of a directional selector valve connected to the control unit 71. The flow channel selector valve 41b is connected to the liquid feeding pump 41a, the air compressor 41c, the alcohol pump 41d, the accessory case 42, and the connector 43, and under the control of the control unit 71, causes at least one of the liquid feeding pump 41a, the air compressor 41c, or the alcohol pump 41d to communicate with at least one of the accessory case 42 or the connector 43.

The air compressor 41c feeds external air Ar to the accessory case 42 and the connector 43. The air compressor 41c is opened to the outside and communicates with the flow channel selector valve 41b. The air compressor 41c is connected to the control unit 71, and under the control of the control unit 71, takes in air Ar from the outside and feeds air to a channel connected to the flow channel selector valve 41b.

The alcohol pump 41d, which is connected to the control unit 71, feeds water removal alcohol stored in the alcohol tank 41e to the connector 43 under the control of the control unit 71.

The circulation pump 41f feeds a liquid from the treatment tank 24 to the circulation nozzle 44. The circulation pump 41f is placed in a channel between the circulation port 41 and the circulation nozzle 44. The circulation pump 41f, which is connected to the control unit 71, takes in the liquid through the circulation port 41, and feeds the liquid to the circulation nozzle 44 under the control of the control unit 71.

The water supply selector valve 41g is a directional selector valve connected to the control unit 71. The water supply selector valve 41g is connected to the circulation pump 41f, the water introduction unit Ri, and the circulation nozzle 44, and under the control of the control unit 71, causes either the circulation pump 41f or the water introduction unit Ri to communicate with the circulation nozzle 44.

The accessory case 42 houses accessories. Bottom part of the accessory case 42 is connected to the flow channel selector valve 41b to allow a fluid to be introduced into the accessory case 42.

The connector 43 is connected to the endoscope E via a non-illustrated connection tube. In other words, the connector 43 makes up an endoscope connecting unit configured to be connected to a channel of the endoscope E. Note that the connector 43 may be structured to connect directly to the endoscope E without a connection tube. To allow a fluid to be introduced into the endoscope E, the connector 43 is connected with the flow channel selector valve 41b.

The cleaning solution introduction unit Cs is configured to allow a cleaning solution to be introduced into the treatment tank 24. The cleaning solution introduction unit Cs includes a cleaning solution nozzle 51, a cleaning solution tank 52a, and a cleaning solution pump 52b.

The cleaning solution nozzle 51 is provided in the treatment tank 24 and ejects the cleaning solution into the treatment tank 24.

The cleaning solution tank 52a is configured to be able to store the cleaning solution. The cleaning solution tank 52a is connected with the cleaning solution nozzle 51.

The cleaning solution pump 52b is provided between the cleaning solution nozzle 51 and the cleaning solution tank 52a, and under the control of the control unit 71, introduces the cleaning solution stored in the cleaning solution tank 52a into the treatment tank 24.

The water introduction unit Ri is configured to be able to introduce a rinsing solution into the treatment tank 24. The water introduction unit Ri includes a water supply hose connecting unit 61, a water introduction valve 62, a water filter 63, and a water introduction valve 64.

The water supply hose connecting unit 61 is connected to external water supply means W.

The water introduction valve 62 is provided in a channel between the water supply hose connecting unit 61 and the water filter 63. The water introduction valve 62, which is connected to the control unit 71, starts or stops water supply from the water supply hose connecting unit 61 to the water filter 63 under the control of the control unit 71.

The water filter 63, which is connected with the water introduction valve 64, filters water introduced through the water supply hose connecting unit 61 and introduces the water into the water introduction valve 64.

The water introduction valve 64 is connected to the water supply selector valve 41g and the tank 31a. The water introduction valve 64 is connected to the control unit 71, and under the control of the control unit 71, causes either the water supply selector valve 41g or the tank 31a to communicate with the water filter 63. When the water supply selector valve 41g communicates with the water filter 63, the water introduction unit Ri introduces the water to be used for rinsing into the treatment tank 24 through the circulation nozzle 44. When the tank 31a communicates with the water filter 63, water for use to dilute a liquid concentrate is introduced into the tank 31a.

The control unit 71 configuring a control apparatus is a processor that includes a central processing unit (hereinafter referred to as a "CPU") 71a and a rewritable memory 71b. Functions of each part of the processor, for example, may be implemented by separate pieces of hardware. Alternatively, some of each part may be implemented by an integral piece of hardware. For example, the processor includes hardware, which can include at least one of a circuit that processes digital signals or a circuit that processes analog signals. Other than the CPU (central processing unit), various types of processor such as a DSP (digital signal processor) are available for use as the processor. The processor may also be a hardware circuit based on an ASIC (application specific integrated circuit) or an FPGA (field programmable gate array). Functions of the control unit 71 are implemented when the CPU 71a executes various programs stored in the memory 71b. The control unit 71 performs not only control over each part of the endoscope reprocessor 1, but also performs an after-mentioned spraying process of spraying a cleaning solution or water toward an inner surface of the top cover 11.

The CPU 71a can read and execute various programs stored in the memory 71b.

The memory 71b stores a program used to perform the spraying process in addition to the various programs executed by the CPU 71a.

Figure 2:
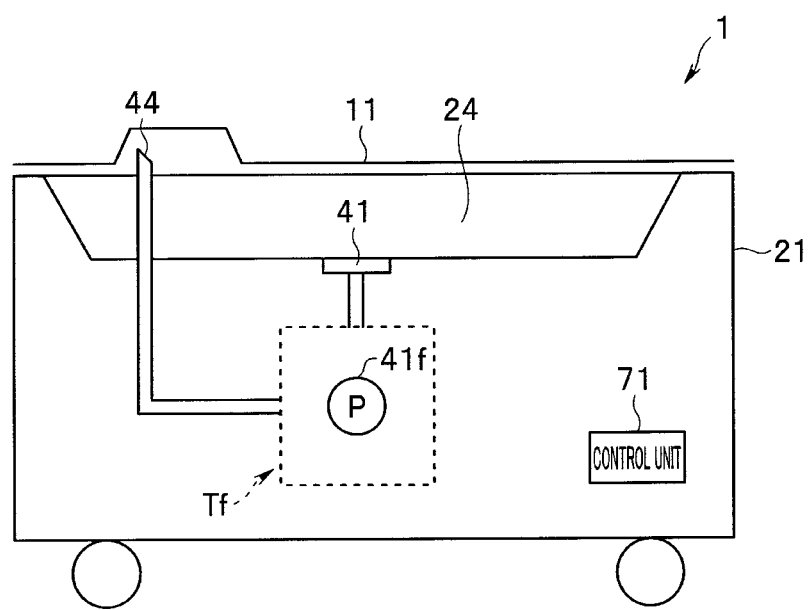
FIG. 2 is a diagram showing principal part of the endoscope reprocessor that performs a spraying process, according to the first embodiment.
Figure 3:
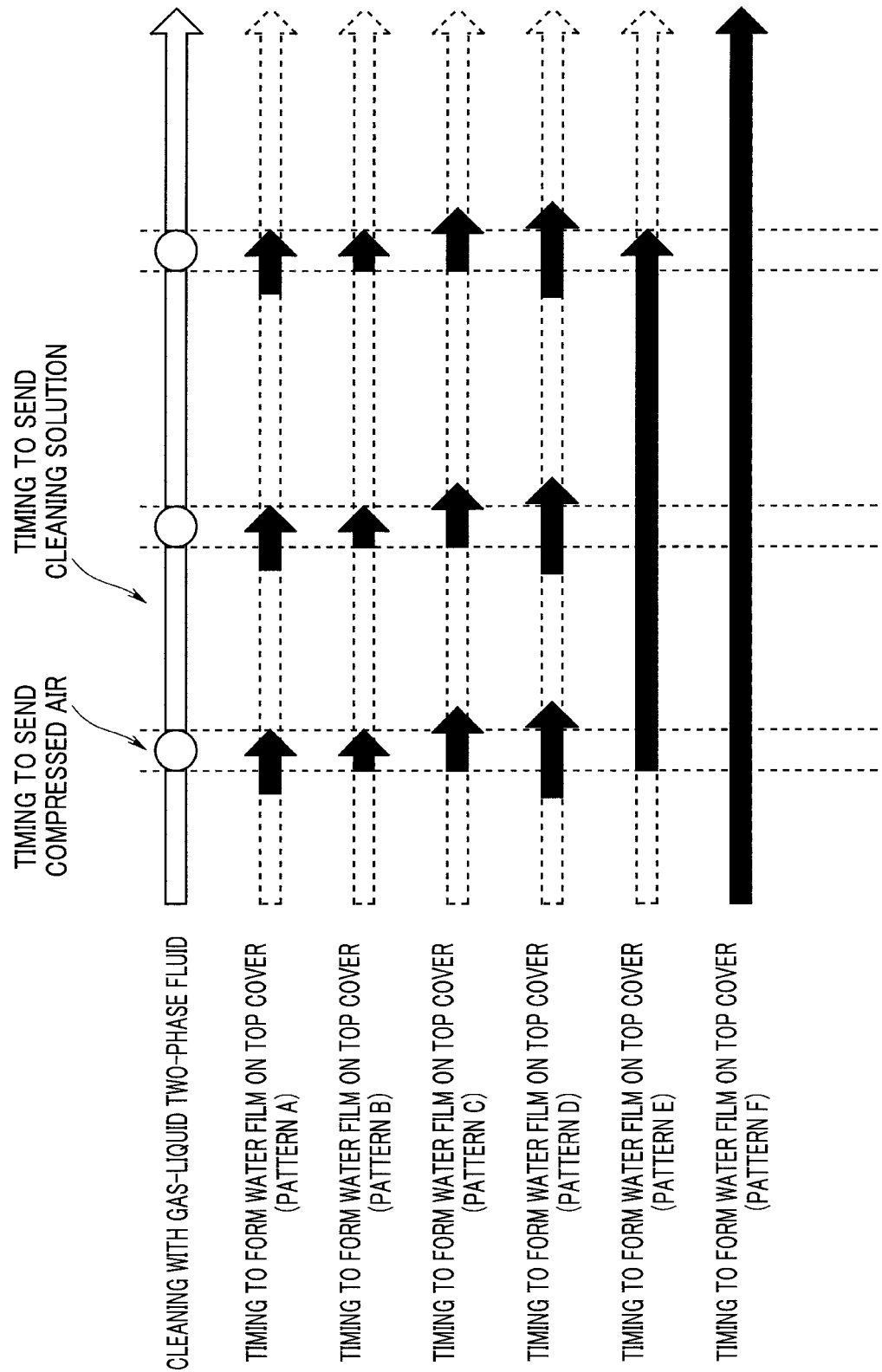
FIG. 3 is a diagram showing an example of timing to eject a cleaning solution to a top cover.

Next, the spraying process will be described using FIGS. 2 and 3. FIG. 2 is a diagram showing principal part of the endoscope reprocessor that performs the spraying process, according to the first embodiment. FIG. 3 is a diagram showing an example of timing to eject a cleaning solution to the top cover.

The endoscope reprocessor 1 according to the present embodiment does cleaning of the endoscope E using a gas-liquid two-phase fluid. By controlling the liquid feeding pump 41a, the flow channel selector valve 41b, and the air compressor 41c, the control unit 71 supplies a cleaning solution or compressed air into the endoscope channel of the endoscope E, with the endoscope channel being connected to the connector 43, which is an endoscope connecting unit.

According to the present embodiment, the control unit 71 supplies the cleaning solution and compressed air alternately into the endoscope channel of the endoscope E. In other words, in the cleaning using the gas-liquid two-phase fluid according to the present embodiment, timing to send the cleaning solution into the endoscope channel and timing to send the compressed air occur alternately. The timing to send the cleaning solution into the endoscope channel and the timing to send the compressed air have been determined in advance by a program. The timing to send the compressed air coincides with timing with which splashes of contaminants and the like gush from an opening portion of the endoscope channel.

Thus, during cleaning done using the gas-liquid two-phase fluid, by controlling the circulation pump 41f, which is a first pump of the fluid feeding unit Tf, the control unit 71 interlocks supply of the compressed air to the endoscope channel with ejection of the cleaning solution from the circulation nozzle 44, which is a first ejection unit. Specifically, as shown in FIG. 3, the control unit 71 causes the cleaning solution to be ejected from the circulation nozzle 44 from a predetermined period earlier than the timing to start supplying compressed air to the endoscope channel until the compressed air is stopped being supplied to the endoscope channel (pattern A).

In this way, the control unit 71 performs the spraying process of spraying the cleaning solution to the inner surface of the top cover 11 by ejecting the cleaning solution from the circulation nozzle 44 by interlocking the spraying with the supply of the compressed air to the endoscope channel Because a water film of the cleaning solution is formed on the inner surface of the top cover 11 as a result of the spraying process, the top cover 11 is not contaminated even if splashes gush from the opening portion of the endoscope channel.

Note that the timing to cause the cleaning solution to be ejected from the circulation nozzle 44 is not limited to the timing of pattern A described above, and another timing may be used as shown in patterns B to F.

The control unit 71 may cause the cleaning solution to be ejected from the circulation nozzle 44, forming a water film on the inner surface of the top cover 11, only during a period in which compressed air is being supplied to the endoscope channel (pattern B).

Alternatively, the control unit 71 may cause the cleaning solution to be ejected from the circulation nozzle 44, forming a water film on the inner surface of the top cover 11, from the timing to start supplying compressed air to the endoscope channel until a predetermined period after the timing to stop supplying the compressed air to the endoscope channel (pattern C).

Alternatively, the control unit 71 may cause the cleaning solution to be ejected from the circulation nozzle 44, forming a water film on the inner surface of the top cover 11, from a predetermined period earlier than the timing to start supplying compressed air to the endoscope channel until a predetermined period after the timing to stop supplying the compressed air to the endoscope channel (pattern D).

Alternatively, during the cleaning done using the gas-liquid two-phase fluid, the control unit 71 may cause the cleaning solution to be ejected from the circulation nozzle 44, forming a water film on the inner surface of the top cover 11, throughout the entire period of sending the compressed air to the endoscope channel (pattern E).

Alternatively, throughout the cleaning done using the gas-liquid two-phase fluid, the control unit 71 may cause the cleaning solution to be ejected from the circulation nozzle 44 constantly, forming a water film on the inner surface of the top cover 11 (pattern F).

Note that although the cleaning solution taken in through the circulation port 41 is caused to be ejected through the circulation nozzle 44 by the control unit 71, this is not restrictive. By controlling the water supply selector valve 41g, the control unit 71 may cause water introduced from the water introduction unit Ri to be ejected through the circulation nozzle 44, forming a water film on the inner surface of the top cover 11.

As described above, by controlling the circulation pump 41f during the cleaning done using the gas-liquid two-phase fluid, the endoscope reprocessor 1 interlocks the supply of the compressed air to the endoscope channel with the ejection of the cleaning solution from the circulation nozzle 44. Even if splashes of contaminants and the like gush from the opening portion when compressed air is supplied to the endoscope channel, by ejecting the cleaning solution from the circulation nozzle 44, thereby forming a water film on the inner surface of the top cover 11, the endoscope reprocessor 1 prevents the contaminants from attaching to the inner surface of the top cover 11.

Thus, the endoscope reprocessor according to the present embodiment can prevent the top cover from contamination with splashes.

Second Embodiment

Next, a second embodiment will be described.

Figure 4:
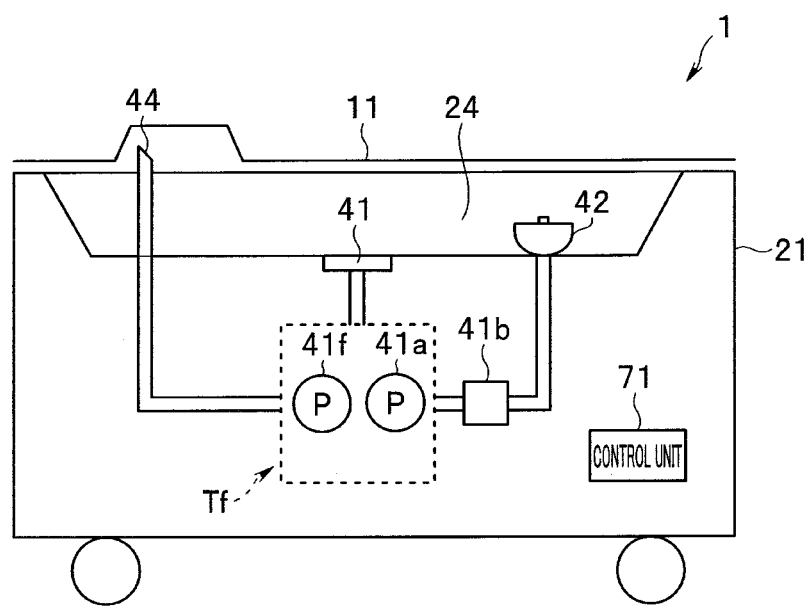
FIG. 4 is a diagram showing principal part of an endoscope reprocessor that performs a spraying process, according to a second embodiment.

FIG. 4 is a diagram showing principal part of an endoscope reprocessor that performs a spraying process, according to a second embodiment.

The endoscope reprocessor 1 according to the second embodiment is similar in overall configuration to the first embodiment. Whereas according to the first embodiment, the circulation nozzle 44 ejects the cleaning solution to the inner surface of the top cover 11, according to the second embodiment, the cleaning solution is ejected to the inner surface of the top cover 11 from the bottom part of the accessory case 42 as well as from the circulation nozzle 44.

In other words, during the cleaning done using the gas-liquid two-phase fluid, by controlling the circulation pump 41f, the control unit 71 causes the cleaning solution to be ejected from the circulation nozzle 44 so as to form a water film on the inner surface of the top cover 11, and by controlling the liquid feeding pump 41a, which is a second pump, and the flow channel selector valve 41b, the control unit 71 causes the cleaning solution to be ejected to the inner surface of the top cover 11 from the bottom part of the accessory case 42 making up a second ejection unit.

By controlling the circulation pump 41f, the liquid feeding pump 41a, and the flow channel selector valve 41b, the control unit 71 can cause the cleaning solution to be ejected to the inner surface of the top cover 11 from one of the circulation nozzle 44 and the accessory case 42.

Because lengths of an insertion section and the like have been established according to the type of endoscope E, when the endoscope E is installed in the treatment tank 24, the location where the opening portion of the endoscope channel is placed has been established according to the type of endoscope E. This makes it possible to understand where on the inner surface of the top cover 11 splashes will fly to according to the type of endoscope E.

The control unit 71 identifies the type of endoscope based on endoscope information read and outputted by the tag reader 23 and causes the cleaning solution to be ejected only to a predetermined location on the inner surface of the top cover 11. Specifically, by controlling the liquid feeding pump 41a and the circulation pump 41f, the control unit 71 ejects the cleaning solution to that area on the inner surface of the top cover 11 which is near the opening portion of the channel of the endoscope E with the endoscope E being placed in the treatment tank 24.

With the above configuration, by causing the cleaning solution to be ejected to the inner surface of the top cover 11 from the accessory case 42 as well as from the circulation nozzle 44, the endoscope reprocessor 1 according to the present embodiment can cause the cleaning solution to be ejected to a wide area on the inner surface of the top cover 11.

Furthermore, by determining the type of endoscope E based on the endoscope information from the tag reader 23, the endoscope reprocessor 1 can cause the cleaning solution to be ejected only to a predetermined location on the inner surface of the top cover 11 according to the type of endoscope E.

Third Embodiment

Next, a third embodiment will be described.

Figure 5:
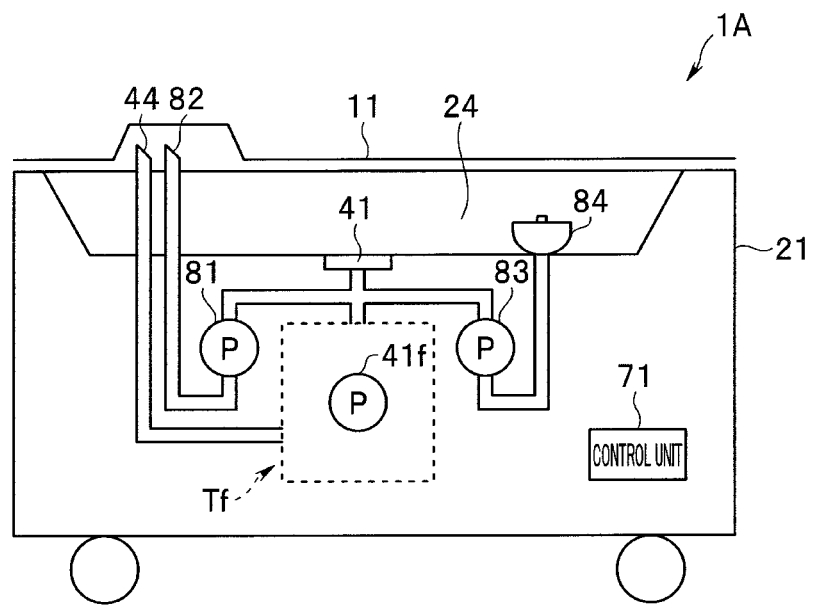
FIG. 5 is a diagram showing principal part of an endoscope reprocessor that performs a spraying process, according to a third embodiment.

FIG. 5 is a diagram showing principal part of an endoscope reprocessor that performs a spraying process, according to the third embodiment.

Compared to the endoscope reprocessor 1 according to the first embodiment, the endoscope reprocessor 1A according to the third embodiment additionally includes a pump 81, a circulation nozzle 82, a pump 83, and an accessory case 84. The circulation port 41 is connected to the pump 81 and the pump 83 as well as to the liquid feeding pump 41a and the circulation pump 41f.

The pump 81 is placed in a channel between the circulation port 41 and the circulation nozzle 82. The pump 83 is placed in a channel between the circulation port 41 and the accessory case 84.

The control unit 71 identifies the type of endoscope based on endoscope information outputted by the tag reader 23 and causes the cleaning solution to be ejected only to a predetermined location on the inner surface of the top cover 11. Specifically, by controlling at least one of the circulation pump 41f, the pump 81, or the pump 83, the control unit 71 causes the cleaning solution to be ejected to the inner surface of the top cover 11 from one of the circulation nozzle 44, the circulation nozzle 82, and the accessory case 84.

As described above, by controlling at least one of a plurality of pumps according to the type of endoscope E during the cleaning done using the gas-liquid two-phase fluid, the control unit 71 causes the cleaning solution to be ejected to a predetermined location on the inner surface of the top cover 11.

As a result, the endoscope reprocessor 1A according to the present embodiment can cause the cleaning solution to be ejected only to a predetermined location on the inner surface of the top cover 11 according to the type of endoscope E.

Fourth Embodiment

Next, a fourth embodiment will be described.

Figure 6:
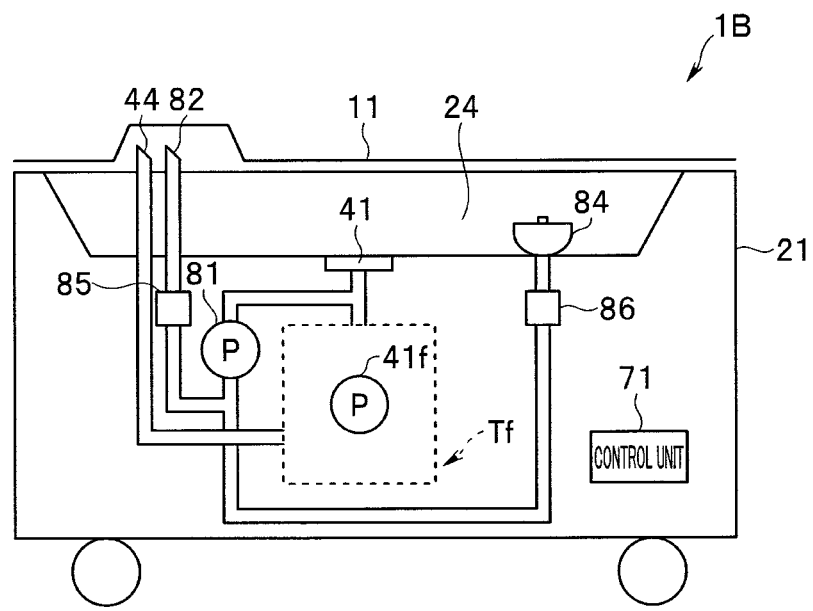
FIG. 6 is a diagram showing principal part of an endoscope reprocessor that performs a spraying process, according to a fourth embodiment.

FIG. 6 is a diagram showing principal part of an endoscope reprocessor that performs a spraying process, according to the fourth embodiment.

The endoscope reprocessor 1B according to the fourth embodiment is obtained by removing the pump 83 from, and adding solenoid valves 85 and 86 to, the endoscope reprocessor 1A according to the third embodiment. Note that the endoscope reprocessor 1B, which is configured to include the solenoid valves 85 and 86, may be configured to include either one of the solenoid valves.

The solenoid valve 85 is connected to the pump 81 and the circulation nozzle 82, and the solenoid valve 86 is connected to the pump 81 and the accessory case 84.

The control unit 71 identifies the type of endoscope E based on endoscope information outputted by the tag reader 23 and causes the cleaning solution to be ejected only to a predetermined location on the inner surface of the top cover 11. Specifically, by controlling the circulation pump 41f, the pump 81, and the solenoid valves 85 and 86 according to the type of endoscope E, the control unit 71 causes the cleaning solution to be ejected to the inner surface of the top cover 11 from at least one of the circulation nozzles 44, 82 or the accessory case 84.

As a result, the endoscope reprocessor 1B according to the present embodiment can cause the cleaning solution to be ejected only to a predetermined location on the top cover 11 according to the type of endoscope E.

It should be noted that the present invention is not limited to the embodiments described above, and needless to say, various alterations, combinations, and applications are possible without departing from the gist of the invention.

What is claimed is:

1. An endoscope reprocessor comprising:
   a cleaning tank in which an endoscope is placed;
   an endoscope connector configured to be connected to a channel of the endoscope;
   a top cover configured to cover an upper part of the cleaning tank;
   a nozzle configured to eject a cleaning solution toward an inner surface of the top cover;
   a first pump connected to the nozzle; and
   a control unit provided with a processor configured to feed a liquid to the channel of the endoscope by controlling the first pump, wherein
   the processor acquires a type of the endoscope, controls the first pump during cleaning according to the type of the endoscope, and causes the cleaning solution to be delivered from the nozzle.

2. The endoscope reprocessor according to claim 1, wherein by controlling the first pump during cleaning done using a gas-liquid two-phase fluid made up of a cleaning solution and air supplied alternately to the channel of the endoscope, the processor causes the cleaning solution to be ejected from the nozzle from a predetermined period earlier than a timing to start supplying the air to the endoscope connector until the air is stopped being supplied to the endoscope connector.

3. The endoscope reprocessor according to claim 1, further comprising:
   a second ejection unit configured to eject the cleaning solution toward the inner surface of the top cover; and
   a second pump connected to the second ejection unit, wherein
   by controlling the first pump or the second pump according to the type of the endoscope, the processor causes the cleaning solution to be ejected to a predetermined location on the inner surface of the top cover from the first or second ejection unit.

4. The endoscope reprocessor according to claim 3, wherein the predetermined location on the inner surface of the top cover is an area in a neighborhood of an opening portion of the channel of the endoscope placed in the cleaning tank.

5. The endoscope reprocessor according to claim 1, wherein by controlling the first pump during cleaning done using a gas-liquid two-phase fluid made up of a cleaning solution and air supplied alternately to the channel of the endoscope, the processor causes the cleaning solution to be ejected from the nozzle only during a period in which the air is being supplied to the endoscope connector.

6. The endoscope reprocessor according to claim 1, wherein by controlling the first pump during cleaning done using a gas-liquid two-phase fluid made up of a cleaning solution and air supplied alternately to the channel of the endoscope, the processor causes the cleaning solution to be ejected from the nozzle from a timing to start supplying the air to the endoscope connector until a predetermined period after a timing to stop supplying the air to the endoscope connector.

7. The endoscope reprocessor according to claim 1, wherein by controlling the first pump during cleaning done using a gas-liquid two-phase fluid made up of a cleaning solution and air supplied alternately to the channel of the endoscope, the processor causes the cleaning solution to be ejected from the nozzle from a predetermined period earlier than a timing to start supplying the air to the endoscope connector until a predetermined period after a timing to stop supplying the air to the endoscope connector.

8. The endoscope reprocessor according to claim 1, wherein by controlling the first pump during cleaning done using a gas-liquid two-phase fluid made up of a cleaning solution and air supplied alternately to the channel of the endoscope, the processor causes the cleaning solution to be ejected from the nozzle throughout an entire period of supplying the air to the endoscope connector.

* * * * *